United States Patent
Zhu et al.

(10) Patent No.: US 10,630,044 B2
(45) Date of Patent: Apr. 21, 2020

(54) FREQUENCY-DOUBLED LASER AND METHOD OF GENERATING HARMONIC LASER

(71) Applicant: HAN'S LASER TECHNOLOGY INDUSTRY GROUP CO., LTD., Shenzhen, Guangdong (CN)

(72) Inventors: Baohua Zhu, Guangdong (CN); Zhiqiang Fang, Guangdong (CN); Yezhao Lu, Guangdong (CN); Jin Wang, Guangdong (CN); Yunfeng Gao, Guangdong (CN)

(73) Assignee: HAN'S LASER TECHNOLOGY INDUSTRY GROUP CO., LTD., Shenzhen, Guangdong (CN)

(*) Notice: Subject to any disclaimer, the term of this patent is extended or adjusted under 35 U.S.C. 154(b) by 5 days.

(21) Appl. No.: 15/748,161

(22) PCT Filed: Aug. 8, 2017

(86) PCT No.: PCT/CN2017/096449
§ 371 (c)(1),
(2) Date: Jan. 26, 2018

(87) PCT Pub. No.: WO2019/028679
PCT Pub. Date: Feb. 14, 2019

(65) Prior Publication Data
US 2019/0190226 A1    Jun. 20, 2019

(51) Int. Cl.
*H01S 3/109*    (2006.01)
*H01S 3/08*    (2006.01)
(Continued)

(52) U.S. Cl.
CPC .............. *H01S 3/1095* (2013.01); *G02F 1/35* (2013.01); *G02F 1/3525* (2013.01); *G02F 1/37* (2013.01);
(Continued)

(58) Field of Classification Search
CPC .... H01S 3/1095; H01S 3/0092; H01S 3/0619; H01S 3/08095; H01S 3/1643;
(Continued)

(56) References Cited

U.S. PATENT DOCUMENTS 5,063,566 A * 11/1991 Dixon ................... H01S 3/0627
359/328
5,130,997 A * 7/1992 Ortiz ...................... A61B 18/20
372/103

(Continued)

FOREIGN PATENT DOCUMENTS

CN    1694320 A  * 11/2005  ............... H01S 3/08
CN    1694320 A    11/2005
(Continued)

OTHER PUBLICATIONS

English Translation of CN102882116A (Year: 2013).*
(Continued)

*Primary Examiner* — Yuanda Zhang
(74) *Attorney, Agent, or Firm* — Polsinelli PC

(57) ABSTRACT

A frequency-doubled laser, including: a first reflecting mirror, a second reflecting mirror, a gain medium, a telescope module, a polarizing element, and a nonlinear crystal; the first reflecting mirror and the second reflecting mirror are spaced apart to form a resonator of the frequency-doubled laser; the polarizing element, the gain medium, the telescope module, and the nonlinear crystal are located in the resonator, and the telescope module is located between the gain medium and the nonlinear crystal. The present disclosure (Continued)

further provides a method of generating harmonic laser. The frequency-doubled laser and the method of generating harmonic laser make the position of nonlinear crystal more flexible, and the possibility of damage to the nonlinear crystal is reduced.

1 Claim, 4 Drawing Sheets

(51) Int. Cl.
*H01S 3/081* (2006.01)
*H01S 3/16* (2006.01)
*H01S 3/06* (2006.01)
*H01S 3/00* (2006.01)
*G02F 1/37* (2006.01)
*G02F 1/35* (2006.01)
*H01S 3/0941* (2006.01)
*H01S 3/17* (2006.01)
*H01S 3/092* (2006.01)

(52) U.S. Cl.
CPC .......... *H01S 3/0092* (2013.01); *H01S 3/0619* (2013.01); *H01S 3/08* (2013.01); *H01S 3/0815* (2013.01); *H01S 3/08054* (2013.01); *H01S 3/08095* (2013.01); *H01S 3/109* (2013.01); *H01S 3/1611* (2013.01); *H01S 3/1643* (2013.01); *H01S 3/0816* (2013.01); *H01S 3/08059* (2013.01); *H01S 3/092* (2013.01); *H01S 3/0941* (2013.01); *H01S 3/1608* (2013.01); *H01S 3/17* (2013.01)

(58) Field of Classification Search
CPC .. H01S 3/1611; H01S 3/0815; H01S 3/08054; H01S 3/092; H01S 3/1608; H01S 3/17; H01S 3/0941
See application file for complete search history.

(56) References Cited

U.S. PATENT DOCUMENTS

| | | | | |
|---|---|---|---|---|
| 6,130,900 | A * | 10/2000 | Black | A61B 18/203 372/22 |
| 7,411,991 | B2 * | 8/2008 | Lawrence | G11B 7/127 372/21 |
| 2004/0028108 | A1 * | 2/2004 | Govorkov | H01S 3/0941 372/70 |
| 2004/0073200 | A1 * | 4/2004 | Caudle | A61F 9/008 606/5 |
| 2007/0160096 | A1 * | 7/2007 | Tanaka | B23K 26/0626 372/33 |
| 2009/0245294 | A1 | 10/2009 | Alkulov et al. | |
| 2013/0315270 | A1 * | 11/2013 | Kumazaki | H01S 3/10069 372/20 |
| 2014/0109678 | A1 * | 4/2014 | Ichihara | H01S 3/092 73/655 |
| 2014/0219297 | A1 * | 8/2014 | Backus | H01S 3/08018 372/18 |
| 2016/0143692 | A1 | 5/2016 | Shang et al. | |
| 2018/0123312 | A1 * | 5/2018 | Furusato | H01S 3/134 |

FOREIGN PATENT DOCUMENTS

| | | | | |
|---|---|---|---|---|
| CN | 2833967 | Y | | 11/2006 |
| CN | 200947523 | Y | | 9/2007 |
| CN | 101340051 | A | | 1/2009 |
| CN | 102882116 | A * | 1/2013 | ............ H01S 3/109 |
| CN | 102882116 | A | | 1/2013 |
| CN | 106941239 | A | | 7/2017 |
| JP | 04-275475 | A | | 10/1992 |

OTHER PUBLICATIONS

"Abstract of Guo, Jianyang et al., Research on Pulse Green Laser, Feb. 2013" (1 page).
International Search Report dated Mar. 28, 2018 in PCT/CN2017/096449 (3 pages).
Office Action dated Aug. 30, 2019 in corresponding Chinese Application No. 2018-515266 (2 pages).

* cited by examiner

FREQUENCY-DOUBLED LASER AND METHOD OF GENERATING HARMONIC LASER

CROSS REFERENCE TO RELATED APPLICATIONS

This application is a National Phase filing under 35 U.S.C. § 371 of PCT/CN2017/096449 filed on Aug. 8, 2017. The entire content of the application is hereby incorporated by reference.

FIELD OF THE INVENTION

The present disclosure relates to a frequency-doubled laser and a method of generating harmonic laser, belonging to a field of laser.

BACKGROUND OF THE INVENTION

With a rise of electric vehicles and a vigorous development of new energy industry, an urgent need for high power circuit and battery technologies has been put forward. As an important conductive material, a high-effective and stable welding of copper has become has become a focus of attention. Since copper has a high thermal conductivity and the near-infrared laser absorption rate of copper is relatively low at room temperature and will suddenly rise near the melting point, the laser welding process can be easily affected by the surface quality of workpieces. Copper laser welding is still a very challenging issue.

The defects in copper laser welding can be addressed by using long pulse green light (pulse width greater than 100 μs). In the green band, the laser absorption rate of copper can reach 40%, and the focused green light has a smaller focal spot and a higher power density, thus a high-quality welding spot can be easily accessed. Therefore, using long pulse green laser as a welding light source can significantly improve the productivity and quality of copper wielding.

Currently, high energy laser of visible spectrum is mainly based on a short or ultra-short pulse laser apparatus, such as a Q-switched laser apparatus. For a quasi-continuous high energy solid-state laser system, the conversion efficiency is relatively low due to the beam quality and the peak power density of the fundamental frequency light. A conventional long pulse green light laser apparatus with intracavity frequency doubling improves the fundamental frequency light power density in the nonlinear crystal by inserting a lens into the resonator. However, this method requires to restrict the assembly position of the nonlinear crystal to a quite small range, and the nonlinear crystal can be easily damaged.

SUMMARY OF THE INVENTION

Accordingly, it is necessary to provide a frequency-doubled laser and a method of generating harmonic laser with a flexible position of nonlinear crystal and reduced damage to the nonlinear crystal.

A frequency-doubled laser includes: a first reflecting mirror, a second reflecting mirror, a gain medium, a telescope module, a polarizing element, and a nonlinear crystal; the first reflecting mirror and the second reflecting mirror are spaced apart to form a resonator of the frequency-doubled laser; the polarizing element, the gain medium, the telescope module, and the nonlinear crystal are located in the resonator, and the telescope module is located between the gain medium and the nonlinear crystal.

In one of the embodiments, the gain medium, a first cavity lens, a second cavity lens, the nonlinear crystal are arranged along a straight line.

In one of the embodiments, the telescope module includes a first cavity lens and a second cavity lens, the first cavity lens and the second cavity lens are spaced apart along a laser emitted from the gain medium, and the gain medium coincides with an optical axis of the first cavity lens and the second cavity lens.

In one of the embodiments, the first cavity lens is a plano-concave lens, the second cavity lens is a plano-convex lens, and a concave surface of the plano-concave lens is opposite to a convex surface of the plano-convex lens.

In one of the embodiments, the polarizing element is located between the first reflecting mirror and the telescope module, and the polarizing element is configured to convert a fundamental frequency laser outputted from the gain medium to a linearly polarized light.

In one of the embodiments, a polarizing direction of the polarizing element is parallel with or perpendicular to an optical axis of the nonlinear crystal, or the polarizing direction forms an angle of 45° with the optical axis of the nonlinear crystal.

In one of the embodiments, the frequency-doubled laser further includes a harmonic outputting mirror located between the gain medium and the telescope module configured to output a harmonic laser.

In one of the embodiments, the harmonic outputting mirror has opposed first and second surfaces, the first surface faces the nonlinear crystal, the second surface faces the gain medium, the first surface is coated with a first harmonic outputting mirror film and configured to reflect the harmonic laser and transmit the fundamental frequency laser; the second surface is coated with a second harmonic outputting mirror film, the second harmonic outputting mirror film is a fundamental frequency antireflective film configured to enhance the transmission of the fundamental frequency laser.

In one of the embodiments, the polarizing element, the gain medium, the telescope module, and the nonlinear crystal are arranged in a zigzag shaped configuration.

In one of the embodiments, the telescope module includes a first cavity lens and a second cavity lens, the polarizing element, the gain medium, and the second cavity lens are collinearly arranged along a first straight line; and the first cavity lens and the nonlinear crystal are collinearly arranged along a second straight line.

In one of the embodiments, the first cavity lens forms an angle with the first straight line, and a normal line of the second cavity lens forms an angle with the second straight line.

In one of the embodiments, the first cavity lens and the second cavity lens are opposite to each other, and the first cavity lens is a holophote, the second cavity lens is a harmonic outputting mirror and configured to output a harmonic laser and reflect a fundamental frequency laser.

A method of generating harmonic laser using the aforementioned frequency-doubled laser, the method includes:

setting a focusing quantity Δ of the frequency-doubled laser to be 0, wherein the focusing quantity Δ is L−(f$_1$+f$_2$), L is a distance between the first cavity lens and the second cavity lens, f$_1$ is a focal length of the first cavity lens, and f$_2$ is a focal length of the second cavity lens;

exciting the gain medium to output the fundamental frequency laser, and detecting a luminous energy of the outputted harmonic laser;

adjusting the focusing quantity Δ in a forward or a reversed direction, and adjusting the focusing quantity until the harmonic laser output is stopped; and selecting a position with a maximum harmonic outputting energy, acquiring a position of an optimal focusing quantity, and outputting the harmonic laser.

According to the aforementioned frequency-doubled laser and the method of generating harmonic laser, a telescope resonant system is located in the frequency-doubled laser, thus there is no focal spot in the resonator, the position of nonlinear crystal is more flexible, and the possibility of damage to the nonlinear crystal is reduced.

Figure 1:
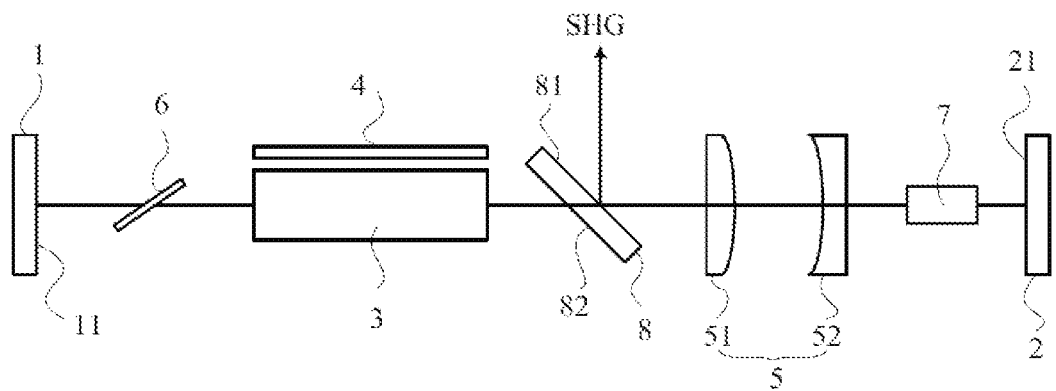
FIG. 1 is a schematic diagram of a frequency-doubled laser according to the first embodiment.

| List of reference numerals | |
|---|---|
| frequency-doubled laser | 100 |
| first reflecting mirror | 1 |
| first reflecting film | 11 |
| second reflecting mirror | 2 |
| second reflecting film | 21 |
| gain medium | 3 |
| pumping unit | 4 |
| telescope module | 5 |
| first cavity lens | 51 |
| first cavity lens film | 511 |
| second cavity lens | 52 |
| second cavity lens film | 521 |
| polarizing element | 6 |
| nonlinear crystal | 7 |
| harmonic outputting mirror | 8 |
| first outputting mirror film | 81 |
| second outputting mirror film | 82 |

DETAILED DESCRIPTION OF THE EMBODIMENTS

The present disclosure will be described in details in combination with the accompanying drawings and embodiments such that the purpose, technical solution and advantages of the present disclosure will be more apparent. It should be understood that the particular embodiments are described for the purpose of illustrating as opposed to restricting the present invention.

It should be understood that, the terms such as "first" and "second" recited in the present disclosure may be used herein to describe various elements, but there elements are not limited by these terms. There terms are only intended to distinguish a first element from another element.

Referring to FIG. 1, a frequency-doubled laser 100 according to present disclosure includes a first reflecting mirror 1, a second reflecting mirror 2, a gain medium 3, a telescope module 5, a polarizing element 6, and a nonlinear crystal 7. The first reflecting mirror 1 and the second reflecting mirror 2 are spaced apart to form a resonator of the frequency-doubled laser 100, the polarizing element 6, the gain medium 3, the telescope module 5, and the nonlinear crystal 7 are located in the resonator.

The first reflecting mirror 1 and the second reflecting mirror 2 are spaced apart. The first reflecting mirror 1 fully reflects fundamental frequency laser in the resonator, and the second reflecting mirror 2 fully reflects both the fundamental frequency laser and harmonic laser. The first reflecting mirror 1 can be coated with a first reflecting film 11 to reflect the fundamental frequency laser; and the second reflecting mirror 2 can be coated with a second reflecting film 21 to reflect the fundamental frequency laser and the harmonic laser.

The gain medium 3 is provided adjacent to the first reflecting mirror 1, the gain medium is configured to output the fundamental frequency laser, and the pulse width of the fundamental frequency laser can be larger than 100 μm. The gain medium 3 can be an Nd: YAG crystal, or it can be other gain mediums such as Nd: Glass, Yb: YAG, Er: YAG, etc. Both ends of the gain medium 3 are coated with a 1064 nm antireflective film.

The telescope module 5 is located in the resonator between the gain medium 3 and the second reflecting mirror 2. The telescope module 5 is configured to increase an equivalent cavity length of the resonator, so as to reduce a divergence angle of the fundamental frequency light in the nonlinear crystal 7, and to increase an area ratio of the fundamental frequency light in the gain medium 3 and the nonlinear crystal 7. The telescope module 5 includes a first cavity lens 51 and a second cavity lens 52, which are spaced apart along a laser emitted from the gain medium 3. the gain medium 3 coincides with an optical axis of the first cavity lens 51 and the second cavity lens 52. In addition, the first cavity lens 51 can be a plano-concave lens, the second cavity lens 52 is a plano-convex lens, and a concave surface of the plano-concave lens is opposite to a convex surface of the plano-convex lens. A distance between the plano-concave lens and the plano-convex lens is L, a focal length of the plano-concave lens is $f_1$, and a focal length of the plano-convex lens is $f_2$, then a focusing quantity of the telescope module 5 is $\Delta=L-(f_1-f_2)$. By adjusting the focusing quantity of the telescope module 5, the frequency doubling efficiency can be optimized. By setting the telescope module 5, the equivalent cavity length of the resonator is increased, which is advantageous to obtain a higher beam quality, so as to obtain a higher frequency doubling efficiency. It should to be understood that, the plano-concave lens and the plano-convex lens are only specific embodiments, the first cavity 51 and the second cavity lens 52 can be selected according to actual needs, as long as they can increase the equivalent cavity length of the resonator.

The nonlinear crystal 7 is located between the telescope module 5 and the second reflecting mirror 2, so as to generate a second or higher harmonic. An optical axis of the nonlinear crystal 7 can be coincide with optical axes of the first cavity lens 51 and the second cavity lens 52. In addition, the gain medium 3, a first cavity lens 51, a second cavity lens 52, the nonlinear crystal 7 are arranged along a straight line. The nonlinear crystal 7 converts the fundamental frequency laser in the resonator to a frequency-doubled laser via a nonlinear interaction.

The polarizing element 6 is located between the first reflecting mirror 1 and the telescope module 5, and the polarizing element 6 is configured to convert the fundamental frequency laser outputted from the gain medium 3 to a linearly polarized light, so as to facilitate the setting of the polarizing element 6, and to protect the polarizing element 6 from damage. The polarizing element 6 can be collinearly arranged along a straight line with the gain medium 3, the first cavity lens 51, the second cavity lens 52, the nonlinear crystal 7. In addition, a polarizing direction of the polarizing element 6 is parallel with or perpendicular to an optical axis of the nonlinear crystal 7 (phase matching type I), or the polarizing direction forms an angle of 45° with the optical axis of the nonlinear crystal 7 (phase matching type II), so as to implement the phase marching. It should be understood that, the polarizing element 6 can also be located in other position in the resonator.

Additionally, the frequency-doubled laser 100 further includes a harmonic outputting mirror 8 located between the gain medium 3 and the nonlinear crystal 7. The frequency-doubled laser 100 is configured to output the harmonic laser, which can efficiently protect the harmonic outputting mirror 8 from damage, and can also reduce the loss, so as to obtain a higher harmonic outputting efficiency. Specifically, the harmonic outputting mirror 8 can be located between the gain medium 3 and the telescope module 5. A face normal line of the harmonic outputting mirror 8 can form an angle with an optical axis, so as to reflect the harmonic laser and output the harmonic laser out of the resonator. The harmonic outputting mirror 8 has two opposite surfaces, and the two opposite surfaces of the harmonic outputting mirror 8 are both provided with film. specifically, the harmonic outputting mirror 8 has a first surface and a second surface, the first surface is provided facing the nonlinear crystal 7, the second surface is provided facing the gain medium 3. The first surface is coated with a first harmonic outputting mirror film 81, which is a harmonic reflecting film and configured to reflect the harmonic laser and transmit the fundamental frequency laser, so as to reflect the harmonic laser and output the harmonic laser out of the resonator. The second surface is coated with a second harmonic outputting mirror film 82, which is a fundamental frequency antireflective film and configured to enhance the transmission of the fundamental frequency laser in the harmonic outputting mirror 8. It should be understood that, the harmonic outputting mirror 8 can also be located on other positions between the nonlinear crystal 7 and the first reflecting mirror 1, and can be adjusted according to actual needs.

Additionally, the frequency-doubled laser 100 further includes a pumping unit 4 configured to pump light to excite the gain medium 3, so as to generate the fundamental frequency laser. The pumping unit 4 can include a flash lamp or a semiconductor laser.

During the operation of the frequency-doubled laser 100, the fundamental frequency laser outputted by the gain medium 3 is bound between the first reflecting mirror 1 and the second reflecting mirror 2 to get oscillated and amplified. The nonlinear crystal 7 converts part of the fundamental frequency laser to a doubled frequency harmonic laser. The doubled frequency harmonic laser converted by the nonlinear crystal 7 can be coupled and outputted by the harmonic outputting mirror 8 via the resonator.

The harmonic converting efficient of the frequency-doubled laser 100 depends on three parameters: a crystal length, an effective nonlinear coefficient, and an area ratio ($A_1/A_2$) of the fundamental frequency light in the gain medium and the nonlinear crystal. Since changing the former two parameters is relatively difficult, the doubling frequency efficiency can be improved by adjusting the structure of the resonator to get a larger $A_1/A_2$. In addition, reducing the divergence angle of the fundamental frequency laser in the nonlinear crystal can also facilitate the improvement of the doubling frequency efficiency. The telescope module of the present disclosure can simultaneously obtain a relatively larger $A_1/A_2$ and a resonator structure reducing the divergence angle of the fundamental frequency laser in the nonlinear crystal.

Figure 2:
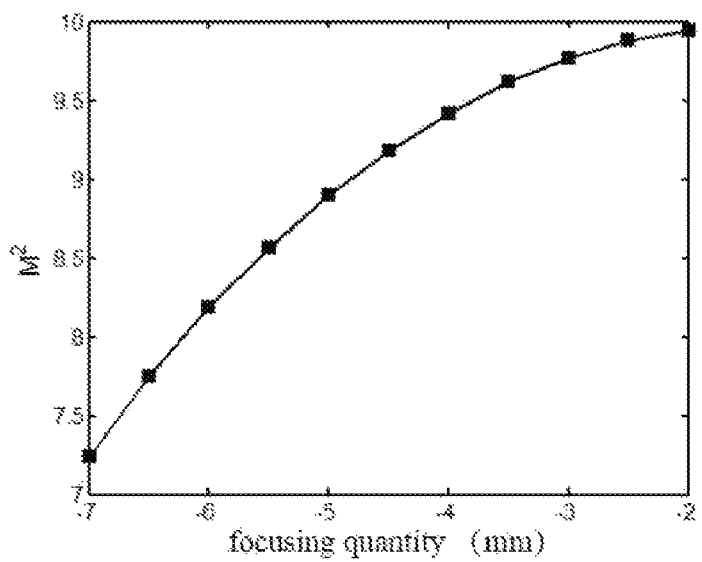
FIG. 2 is a curve of focusing quantity and beam quality factor of fundamental laser beam.
Figure 3:
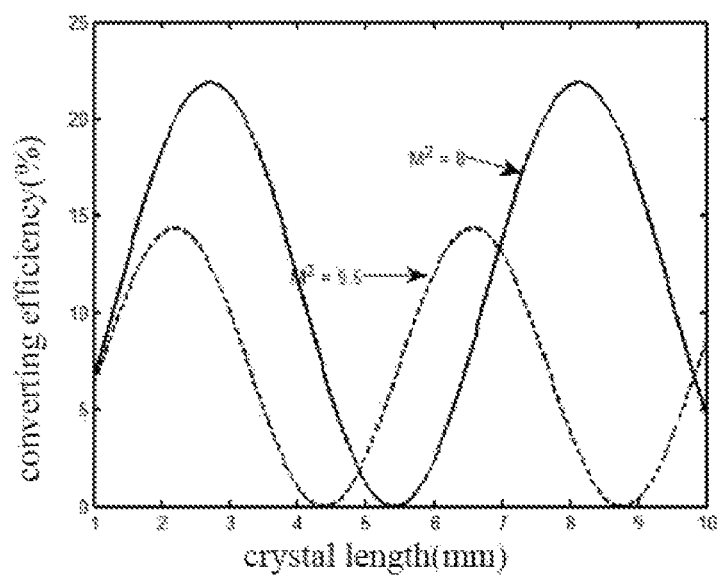
FIG. 3 is a graph illustrating relationship between harmonic conversion efficiency and beam quality factor of fundamental laser beam.
Figure 4:
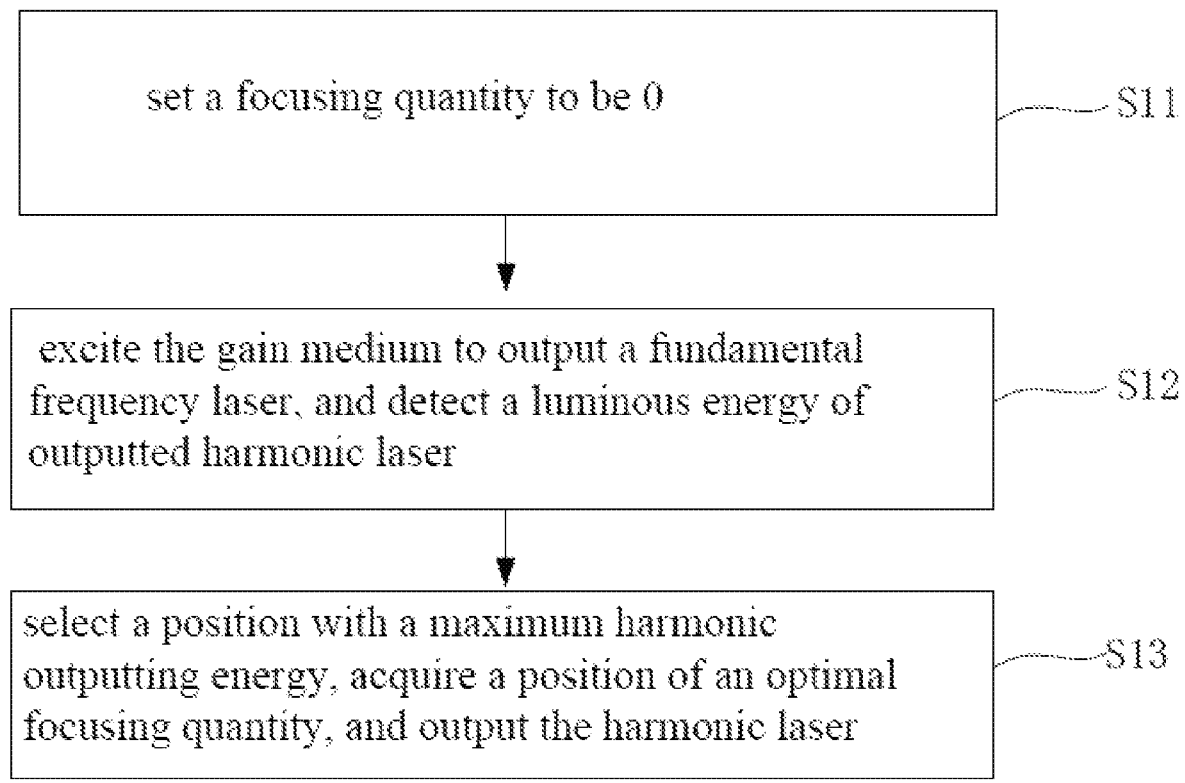
FIG. 4 is a flowchart of a method of generating harmonic laser using the frequency-doubled laser according to an embodiment.
Figure 5:
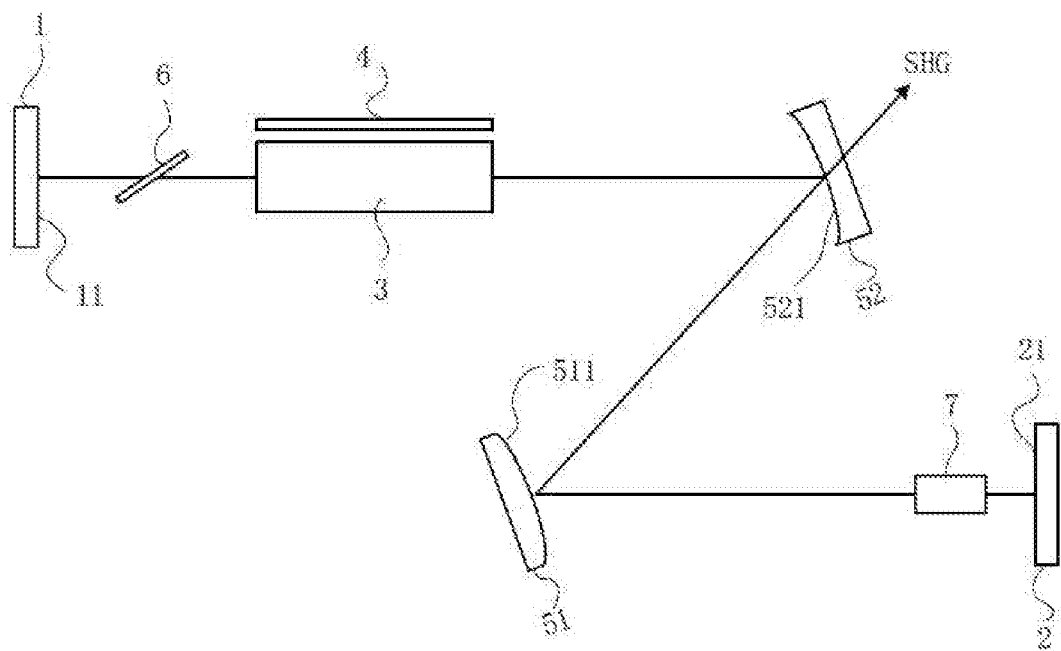
FIG. 5 is a schematic diagram of a frequency-doubled laser according to another embodiment.

Additionally, referring to FIG. 2 and FIG. 3, for the telescope module, fine adjustment of the focusing quantity of the telescope system can implement a fine adjustment of the beam quality of the fundament frequency laser. The telescope module system consists of two groups of lenses, and is located between the gain medium and the nonlinear crystal, and L is a distance between the lenses. Assuming that a focal length of the lenses group adjacent to the gain medium is $f_1$, and a focal length of the lenses group adjacent to the nonlinear crystal is $f_2$, then the focusing quantity $\Delta$ is defined as $L-(f_1+f_2)$. For given nonlinear crystal and resonator structure, a harmonic conversion efficiency can be adjusted in a large range via the fine adjustment of the beam quality.

By introducing the telescope module into the harmonic converting device, the frequency-doubled laser 100 according to aforementioned embodiment has the following advantages:

Firstly, there is no focal spot in the resonator, the position of nonlinear crystal is more flexible, and the possibility of damage to the nonlinear crystal is reduced.

Secondly, the focusing quantity of the telescope module can be adjusted, thus the frequency doubling efficiency is optimized, and the harmonic outputting efficiency is improved.

Thirdly, with the same resonator length, the telescope module can obtain a higher beam quality and a smaller divergence angle, which is beneficial to obtain a higher frequency doubling converting efficiency.

In addition, referring to FIG. 2, in order to output harmonic laser efficiently, a method of generating harmonic laser according to the frequency-doubled laser is provided, which includes:

In step S10, a focusing quantity $\Delta$ is set to be 0.

In step S11, the gain medium is excited to output a fundamental frequency laser, and a luminous energy of outputted harmonic laser is detected.

The energy of the fundamental frequency laser is set to the harmonic luminous energy to be detected by an energy meter.

In step S12, the focusing quantity $\Delta$ is adjusted in a forward or a reversed direction, and the focusing quantity is adjusted until the harmonic laser output is stopped.

When adjusting the focusing quantity of the telescope module, the changing amount of focusing quantity should ensure that the harmonic outputting energy will not change drastically.

In step S13, a position with a maximum harmonic outputting energy is selected, a position of an optimal focusing quantity is acquired, and the harmonic laser is outputted.

By testing the energy of the outputted harmonic, the positions of the first cavity lens 51 and the second cavity lens 52 in the telescope module 5 with the maximum harmonic outputting energy are selected, thus a position with the optimal focusing quantity is acquired.

According to the aforementioned method of generating harmonic laser using the frequency-doubled laser, the harmonic outputting efficiency of the frequency-doubled laser can be improved via adjusting the focusing quantity of the telescope module.

Referring to FIG. 3, a frequency-doubled laser 200 according to another embodiment of present disclosure includes a first reflecting mirror 1, a second reflecting mirror 2, a gain medium 3, a telescope module 5, a polarizing element 6, and a nonlinear crystal 7. The first reflecting mirror 1 and the second reflecting mirror 2 are spaced apart to form a resonator of the frequency-doubled laser 200. The gain medium 3, the telescope module 5, polarizing element 6, and the nonlinear crystal 7 are located in the resonator, and the gain medium 3, the telescope module 5, the polarizing element 6, and the nonlinear crystal 7 are arranged in a zigzag shaped configuration.

The frequency-doubled laser 200 according to the second embodiment is substantially the same as the first embodiment, except that the gain medium 3, the telescope module 5, the polarizing element 6, and the nonlinear crystal 7 are arranged in the zigzag shaped configuration, and the telescope module 5 serves simultaneously as a harmonic outputting mirror configured to output a harmonic laser.

Specifically, the first reflecting mirror 1 and the second reflecting mirror 2 are misaligned, i.e., the first reflecting mirror 1 and the second reflecting mirror 2 are not arranged along the same line. The polarizing element 6, the gain medium 3, and the first reflecting mirror 1 are collinearly arranged along a first straight line; the nonlinear crystal 7 and the second reflecting mirror 2 are collinearly arranged along a second straight line, thus the gain medium 3, the telescope module 5, the polarizing element 6, and the nonlinear crystal 7 are generally arranged in the zigzag shape. The fundamental frequency laser output from the gain medium 3 is reflected by the telescope module 5, then enters the second reflecting mirror 2 via the nonlinear crystal 7; then returns to the first reflecting mirror 1 along the original optical path via the second reflecting mirror 2, thus get oscillated and amplified back and forth between the first reflecting mirror 1 and the second reflecting mirror 2.

The telescope module 5 includes a first cavity lens 51 and a second cavity lens 52, and normal lines of the first cavity lens 51 and the second cavity lens 52 forms angles with a transporting direction of the laser in the resonator. The second cavity lens 52 is collinearly arranged along a line with the first reflecting mirror 1, the polarizing element 6, and the gain medium 3, so as to reflect the fundamental frequency laser to the first cavity lens 51 and output a harmonic laser. The first cavity lens 51 can be collinearly arranged along a line with the nonlinear crystal 7 and the second reflecting mirror 2, so as to reflect the fundamental frequency laser and the harmonic laser reflected from the second reflecting mirror 2 to the second cavity lens again, to output the harmonic laser, and reflect the fundamental frequency laser to the first reflecting mirror 1 via the second cavity lens 52, thus fundamental frequency laser get oscillated and amplified between the first reflecting mirror 1 and the second reflecting mirror 2.

The first cavity lens 51 and the second cavity lens 52 are opposite to each other, the first cavity lens 51 is a holophote configured to reflect the fundamental frequency laser and the harmonic laser; the second cavity lens is simultaneously served as a harmonic outputting mirror and configured to output a harmonic laser and reflect a fundamental frequency laser. Specifically, a surface of the first cavity lens 52 that is opposite to the second cavity lens 52 is coated with a first cavity lens film 511, so as to the fundamental frequency laser and the harmonic laser; a surface of the second cavity lens 52 that is opposite to the first cavity lens 51 is provided with a second cavity lens film 521, so as to transmit the harmonic laser for outputting, and to reflect the fundamental frequency laser.

During the operation of the aforementioned frequency-doubled laser 200 according to the second embodiment, the fundamental frequency laser reflected by the first reflecting mirror 1 passes through the gain medium 3, and enters the second cavity lens 52. After being reflected by the second cavity lens 52, the fundamental frequency laser enters the first cavity lens 51. After being reflected by the first cavity lens 51, the fundamental frequency laser enters the nonlinear crystal 7, then after being reflected by the second reflecting mirror 2, enters the nonlinear crystal 7. Then the fundamental frequency laser passes through the nonlinear crystal 7, the first cavity lens 51 and the second cavity lens 52 again, and returns to the gain medium 3. The fundamental frequency laser passes through the gain medium 3 again and arrive the first reflecting mirror 1, to complete a transportation in the resonator. Thus the fundamental frequency laser is bounded in the resonator formed by the first reflecting mirror 1, the second reflecting mirror 2, the first cavity lens 51, and the second cavity lens 52, and passes through the gain medium 3 back and forth to get amplified. Meanwhile, since the second cavity lens 52 transmits the harmonic laser, the second cavity lens 52 serves as the harmonic outputting mirror, so as to output the harmonic laser.

The frequency-doubled laser 100 according to aforementioned embodiment has the following advantages by introducing a telescope module into a harmonic converting device:

Firstly, there is no focal spot in the resonator, the position of nonlinear crystal is more flexible.

Secondly, the focusing quantity of the telescope module can be adjusted, thus the frequency doubling efficiency is optimized, and the harmonic outputting efficiency is improved.

Thirdly, with the same resonator length, the telescope module can obtain a higher beam quality and a smaller divergence angle, which is beneficial to obtain a higher frequency doubling converting efficiency.

Last but not least, since a resonator cavity lens in the resonator is served as a harmonic outputting cavity lens, no extra harmonic outputting cavity mirror is required, thus the structure is more compact, the effect of the extra harmonic outputting cavity mirror on the transportation of the laser in the resonator can be further reduced, and the outputting efficiency is improved.

Although the present disclosure is illustrated and described herein with reference to specific embodiments, the present disclosure is not intended to be limited to the details shown. Rather, various modifications may be made in the details within the scope and range of equivalents of the claims and without departing from the present disclosure. Therefore, the protection scope of the present disclosure shall be subject to the protection scope of the claims.

What is claimed is:

1. A method of generating harmonic laser using a frequency-doubled laser comprising a first reflecting mirror, a second reflecting mirror, a gain medium, a telescope module, a polarizing element, and a nonlinear crystal; wherein the first reflecting mirror and the second reflecting mirror are spaced apart to form a resonator of the frequency-doubled laser; the polarizing element, the gain medium, the telescope module, and the nonlinear crystal are located in the resonator, and the telescope module is located between the gain medium and the nonlinear crystal, the method comprising:

setting a focusing quantity $\Delta$ of the frequency-doubled laser to be 0, wherein the focusing quantity $\Delta$ is $L-(f_1+f_2)$, L is a distance between a first cavity lens and a second cavity lens, $f_1$ is a focal length of the first cavity lens, and $f_2$ is a focal length of the second cavity lens;

exciting the gain medium to output a fundamental frequency laser, and detecting a luminous energy of outputted harmonic laser;

adjusting the focusing quantity $\Delta$ in a forward or a reversed direction, and adjusting the focusing quantity until the harmonic laser output is stopped; and selecting a position with a maximum harmonic outputting energy, acquiring a position of an optimal focusing quantity, and outputting the harmonic laser.

* * * * *